United States Patent [19]
Rosa et al.

[11] Patent Number: 5,369,264
[45] Date of Patent: Nov. 29, 1994

[54] READING BAR CODES WITH A WIDE LASER BEAM

[75] Inventors: Ralph Rosa, Oakdale; Jay Greenrose, Lindenhurst; Menashe Benzalel, Westbury; Paul Dvorkis, Stony Brook; Christina S. Barkan; Edward Barkan, both of Miller Place, all of N.Y.

[73] Assignee: Symbol Technologies, Inc., Bohemia, N.Y.

[21] Appl. No.: 951,562

[22] Filed: Sep. 25, 1992

Related U.S. Application Data

[63] Continuation-in-part of Ser. No. 592,021, Sep. 28, 1990, Pat. No. 5,218,190.

[51] Int. Cl.$^5$ .............................................. G06K 7/10
[52] U.S. Cl. .................................................. 235/462
[58] Field of Search ............... 235/462, 463, 470, 472, 235/494

[56] References Cited

U.S. PATENT DOCUMENTS

| | | | |
|---|---|---|---|
| 3,780,270 | 12/1973 | Faulkner et al. | 235/462 |
| 3,790,756 | 2/1974 | Graves et al. | 235/462 X |
| 4,606,660 | 8/1986 | Bradshaw et al. | 400/62 |
| 4,641,018 | 2/1987 | Mazumder et al. | 235/494 X |
| 4,777,357 | 10/1988 | Harada et al. | 235/463 |
| 4,822,986 | 4/1989 | Guthmueller et al. | 235/462 |
| 4,825,058 | 4/1989 | Polard | 235/472 |
| 4,896,026 | 1/1990 | Krichever et al. | 235/472 |
| 4,916,298 | 4/1990 | Raphael | 235/470 X |
| 4,980,544 | 12/1990 | Winter | 235/462 X |
| 4,992,649 | 11/1991 | Mampe et al. | 235/462 |
| 5,013,895 | 5/1991 | Iggulden et al. | 235/110 |
| 5,064,258 | 11/1991 | Inokuchi et al. | 350/3.71 |
| 5,073,954 | 12/1992 | Van Tyne et al. | 382/18 |
| 5,115,334 | 5/1992 | Tomita | 359/216 |

*Primary Examiner*—John Shepperd
*Attorney, Agent, or Firm*—James H. Beusse

[57] ABSTRACT

A height- or width-modulated bar code is decoded by scanning an oblong laser beam across the bar code. Light reflected from the bar code varies in intensity as the laser beam traverses dark and light regions of the bar code. The bar code can be decoded by locating the valleys in the variation of intensity of the reflected light, and comparing the depth of these valleys; the deepest valleys correspond to tall or wide bars and the remainder correspond to short or narrow bars.

16 Claims, 14 Drawing Sheets

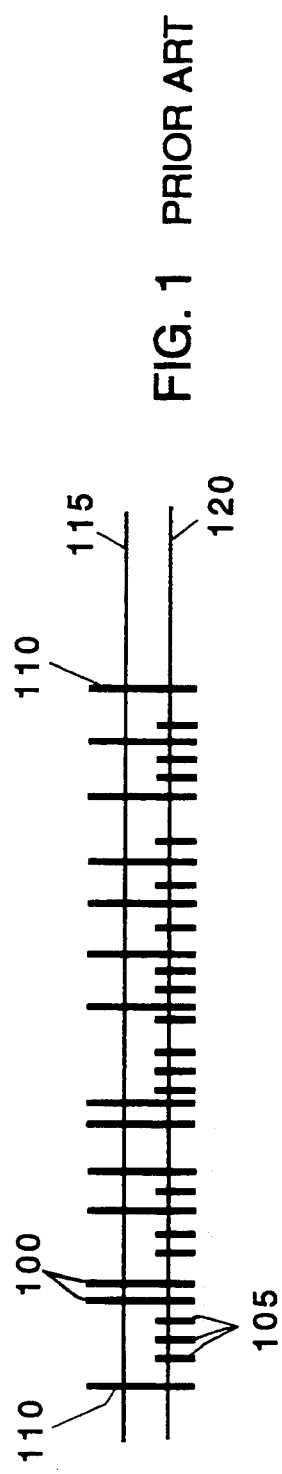
FIG. 1 PRIOR ART
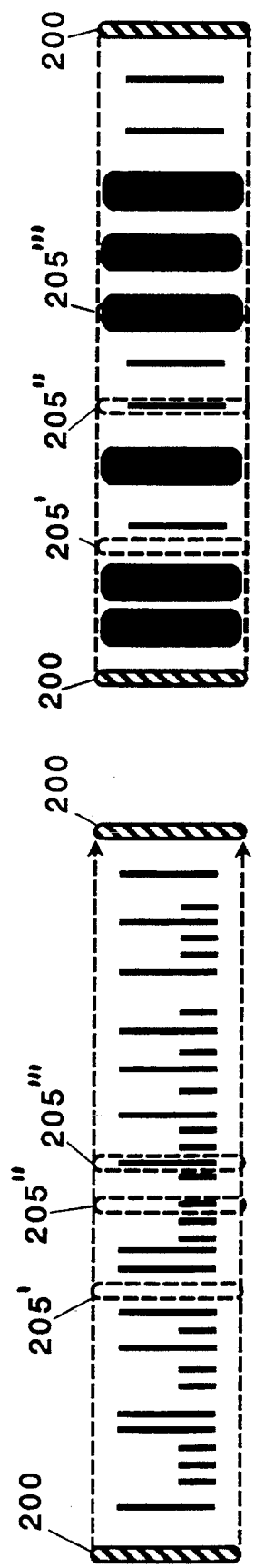
FIG. 2B
FIG. 2A

READING BAR CODES WITH A WIDE LASER BEAM

CROSS-REFERENCE TO RELATED APPLICATION

This application is a continuation-in-part of previously filed copending U.S. patent application Ser. No. 07/592,021 filed Sep. 28, 1990 now U.S. Pat. No. 5,218,190 and assigned to the assignee of the present application.

BACKGROUND OF THE INVENTION

This invention relates to reading systems for reading bar code information and particularly, to a system, apparatus and method for reading bar code formats which encode data in either or both of the relative widths of the bars and spaces, and the relative heights of the bars.

Bar code reading systems for reading preprinted bar codes are well known and are used in many diverse applications, such as, for example, shipping, manufacturing, retail checkout and mail sorting applications. Bar code reading systems are generally arranged to read one or more of the industry standard bar code formats which encode the information in the relative widths of the bars and spaces, such as, for example, Code 39 Interleaved 2 of 5, Discrete 2 of 5 Code 128, Code 92, Codabar, UPC, etc. A bar code reading system captures an electronic image of the bar code and forms a digital representation of the relative widths of the bars and spaces which can be displayed and/or provided to a host computer for subsequent processing.

Bar code reading systems are also well known that read bar code formats which encode data in either or both of the relative widths of the bars and spaces (width-modulation), and/or the relative heights of the bars (height-modulations), such as, for example, Postal Numeric Encoding Technique (POSTNET). POSTNET was developed by the U.S. Postal Service to provide an optimized bar code system for encoding address information on letter mail. Referring to FIG. 1, the basic elements of the POSTNET code are tall bars 100 and short bars 105 representing binary ones and zeros, respectively. Both the tall bars and the short bars are horizontally aligned at the bottom edges. Five bars of code represent one character. Each bar represents a numeric digit and each frame begins and ends with a tall bar 110.

Bar code reading systems designed to decode height-modulated bar code formats are, generally, arranged to capture and store two digital representations of the bar code. A first digital representation of the tall bars is obtained by horizontally scanning through the top portion (along a first visual plane 115) of the bar code where the first visual plane 115 includes the tall bars and excludes the shorter bars. A second digital representation of all the bars (both short and tall) is captured and stored by horizontally scanning through the bottom portion of the bar code (second visual plane 120), where the second visual plane 120 includes both the tall and short bars. The first and the second digital representations are then compared to determine which bars are tall and which are short. The horizontal scanning in the first and second visual planes 115, 120 can be achieved using first and second linear scanning devices appropriately spaced apart, such as, for example, two linear laser scanners or two linear CCD scanners. Alternatively, the first and second visual planes 115, 120 can be acquired using a single linear scanning device, where the bar code and scanner are placed in a first orientation in which the first visual plane 115 is scanned, and then moved to a second orientation where the second visual plane 120 is scanned by the single scanning device.

It is noted that, in order to accomplish a decode utilizing this scheme, the bar code reading system must either have multiple linear scanners or the bar code must be properly oriented and accurately moved relative to single linear scanner thus requiring mechanical manipulation of the bar code and/or scanner. It is also noted that multiple images of the bar code must be translated into digital representations and compared before a decode can occur. As a result, bar code reading systems using these known schemes can be prohibitively complex and expensive for some applications.

Two dimensional charge coupled devices (CCD) that capture a visual image of both the height and widths of the bars and space within the bar code are also well known for reading bar code formats which encode data in either or both of the relative widths of the bars and spaces, and/or the relative heights of the bars. CCD bar code reading systems of this type capture a digital representation of the visual image of the entire bar code and perform a decode by analyzing the relative heights of bars and widths of bars and spaces within the digitized representation. It is noted that these CCD bar code reading systems require digital memory and processing time to accomplish the decode. Further, it is noted that, as compared with laser based bar code reading systems, CCD reading systems of this type require a large surface area to capture the visual images of the entire bar code and the cost of the charged coupled device increases substantially as the surface area of the device increases.

SUMMARY OF THE INVENTION

There are many applications in which it is desirable to scan bar codes with a single linear scanner which does not require movement of the bar code relative to the scanner. For example, a scanner of this type can be used in a relatively simple and relatively inexpensive hand-held device to be used for verifying the acceptability and accuracy of POSTNET bar codes on letter mail.

It is also desirable to use the same hand-held scanner to scan bar codes using different, previously incompatible, bar code symbologies.

According to one aspect of the invention, a symbol (e.g., a bar code) which includes large and small sectors is decoded by scanning an illuminated region across the symbol. More of the illuminated region is occupied by the large sectors than the small sectors, and as a result, the light reflected from the symbol varies in intensity as the light source traverses the sectors of the symbol. The symbol can be decoded by analyzing these variations.

In particular embodiments, the symbol may include tall bars and short bars (as in POSTNET) or wide bars and narrow bars. A laser light source, focused to a long narrow spot, is used to illuminate the symbol, with the long dimension of the spot aligned with the bars.

Decoding the symbol involves locating the valleys in the variation of intensity of the reflected light, and comparing the depth of these valleys; the deepest valleys correspond to tall or wide bars and the remainder correspond to short or narrow bars.

In another aspect of the invention, the above techniques are used to verify the acceptability of a symbol.

First, a calibration symbol is scanned, and then a candidate symbol is scanned. Then the two scans are compared to determine if the candidate symbol is acceptable.

BRIEF DESCRIPTION OF THE DRAWING

FIG. 1 is a plan view of a prior art technique for reading a POSTNET bar code.

FIG. 2A is a plan view of a wide scanning beam reading a POSTNET bar code.

FIG. 2B is a plan view of a wide scanning beam reading a width-modulated bar code.

DESCRIPTION OF THE PREFERRED EMBODIMENT

As shown in FIGS. 2A and 2B, a bar code, which may be either a height-modulated code as in FIG. 2A or a width-modulated code as in FIG. 2B, is scanned by a light source generating a substantially elliptical illuminating spot 200. The information in the bar codes is encoded by sequences of relatively unreflective (black) and relatively reflective (white) areas. As the spot 200 traverses the bar code from left to right, it passes over several intermediate positions 205', 205", 205''' shown in FIGS. 2A and 2B. In positions 205', the spot 200 is illuminating a space between the coded bars, and thus the amount of reflected light is at a maximum. In positions 205", the spot 200 is illuminating a short bar (FIG. 2A) or a narrow bar (FIG. 2B), and thus the amount of reflected light is reduced from its maximum value. In positions 205''', the spot 200 is illuminating a long bar (FIG. 2B) or a wide bar (FIG. 2B), and thus the amount of reflected light is further reduced to a minimum value.

Figure 3:
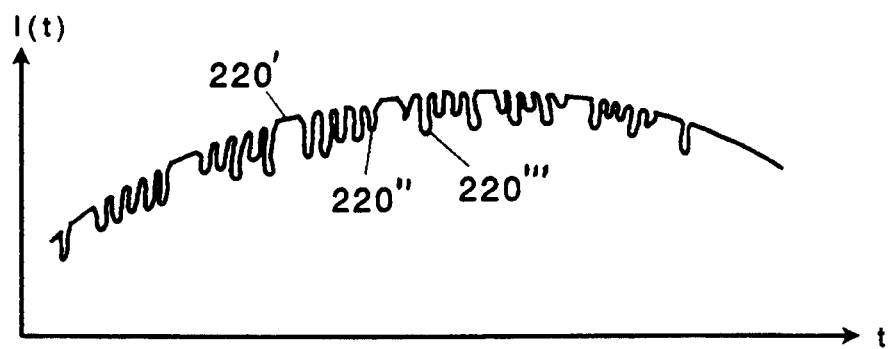
FIG. 3 is a graph of the magnitude of the light intensity received from the bar codes when scanned as shown in FIGS. 2A or 2B.

As shown in FIG. 3, the intensity I(t) of the light reflected from the bar code varies as the illuminating spot 200 traverses the bar code. As the illuminating spot 200 traverses a space between bars, e g , at position 205', the intensity of the reflected light I(t) reaches a local maximum value, e.g., at time 220'. As the illuminating spot traverses a short bar, e.g., at position 205" in FIG. 2A, or a narrow bar, e.g., at position 205" in FIG. 2B, the intensity I(t) is reduced, e.g., at time 220". Furthermore, as the illuminating spot traverses a tall bar, e.g., at position 205'''in FIG. 2A, or a wide bar, e.g., at position 205''' in FIG. 2B, the intensity I(t) reaches a minimum value, e.g., at time 220'''.

As a result, the pattern of tall and short bars in FIG. 2A, or of wide and narrow bars in FIG. 2B, is evident in a pattern of maximum, reduced, and minimum values in the reflected intensity I(t), and can be decoded therefrom. Because a similar intensity characteristic arises for both height-modulated and width-modulated bar codes, the scanning and decoding techniques described herein can be applied to either or both symbologies. Furthermore, a scanner designed in the manner described herein can be configured to decode two or more quite different symbologies, allowing a user to use one scanner in two or more previously incompatible applications, by simply reconfiguring either the hardware or software of the scanner to recognize the new symbology. This flexibility can result in significant cost advantages in some applications.

It will be noted in FIG. 3 that the intensity I(t) follows a low frequency curve, and that the variations in intensity discussed above are high-frequency phenomena modulated over this low frequency curve. The low frequency variations in I(t) are caused by variances in the amount of light reflected from the bar code as the scanning beam illuminates areas at different distances and different angular positions relative to the scanner. The greatest amount of light is received by the scanner when the illuminated area is closest to the scanner and the scanning beam intersects the illuminated area at a right angle; the lowest amount of light is received by the scanner when the illuminated area is at its furthest at the scanning beam intersects the illuminated area at a small acute angle. As the scanning beam sweeps across the bar code, both the distance between the beam and the illuminated area, and the angle at which the beam intersects the illuminated area, change. As a result, the amount of reflected light changes, forming a smooth curve of the type illustrated in FIG. 3.

It should also be noted that in many applications the user must orient the scanner correctly with the bar code. Many bar codes, including POSTNET, are not reversible. Thus, if a POSTNET bar code is read backwards, it may decode into valid, but incorrect address information. A single-beam scanner has no means for determining whether the bars are being scanned in the correct order or (if, e.g., the envelope is held upside-down) in reverse order, and thus may malfunction if the user does not properly orient the bar code.

Figure 4A:
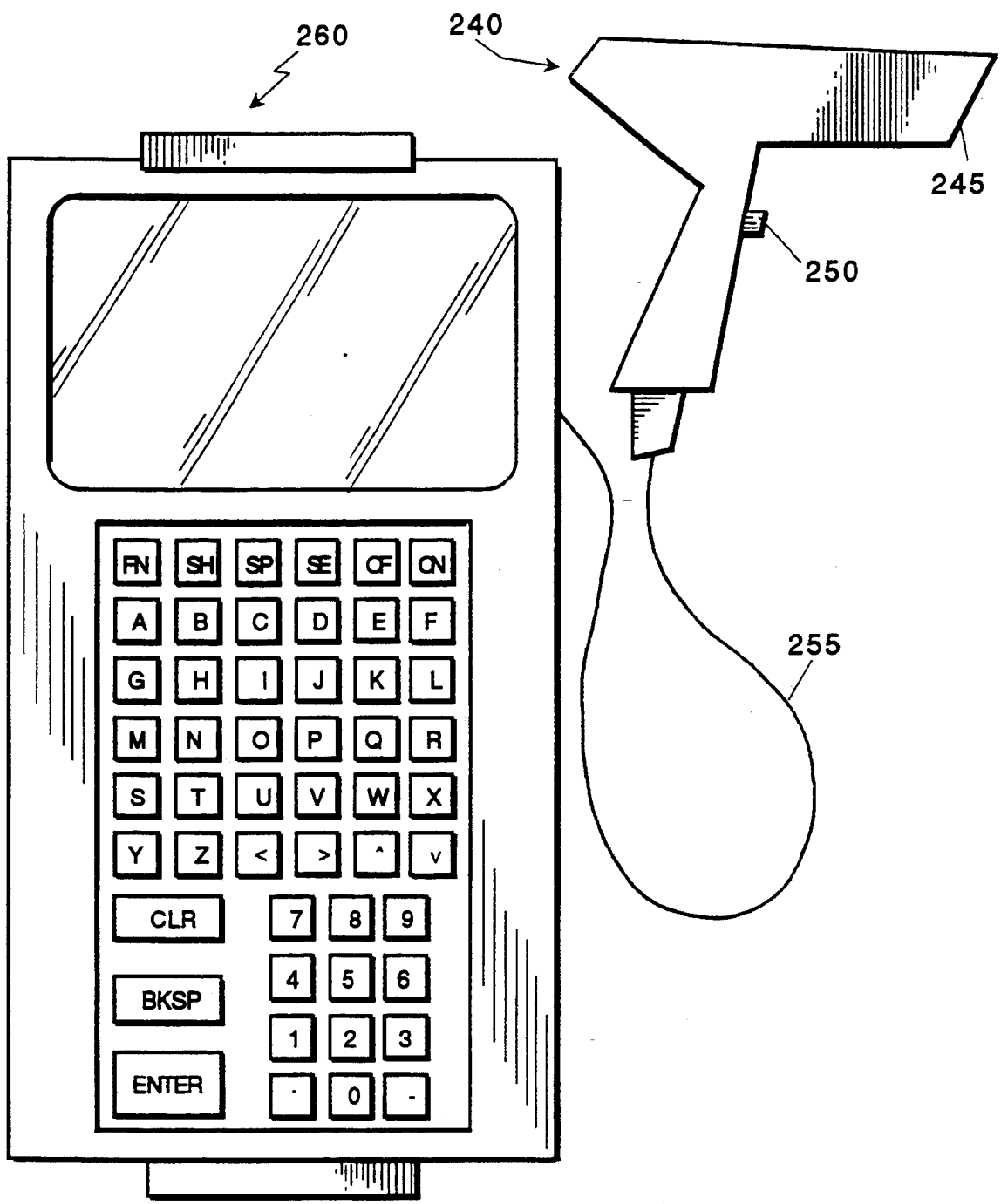
FIG. 4A is a perspective view of a hand-held scanner which generates a wide scanning beam as shown in FIGS. 2A and 2B.

FIG. 4A illustrates one embodiment of a scanning device using the above method to scan a bar code. A hand held scanner 240 emits a substantially elliptical laser beam through aperture 245 when a user presses trigger 250. The laser beam sweeps through an angular region sufficient to span the width of the bar code when the bar code is at the appropriate distance from the scanner.

Figure 4B:
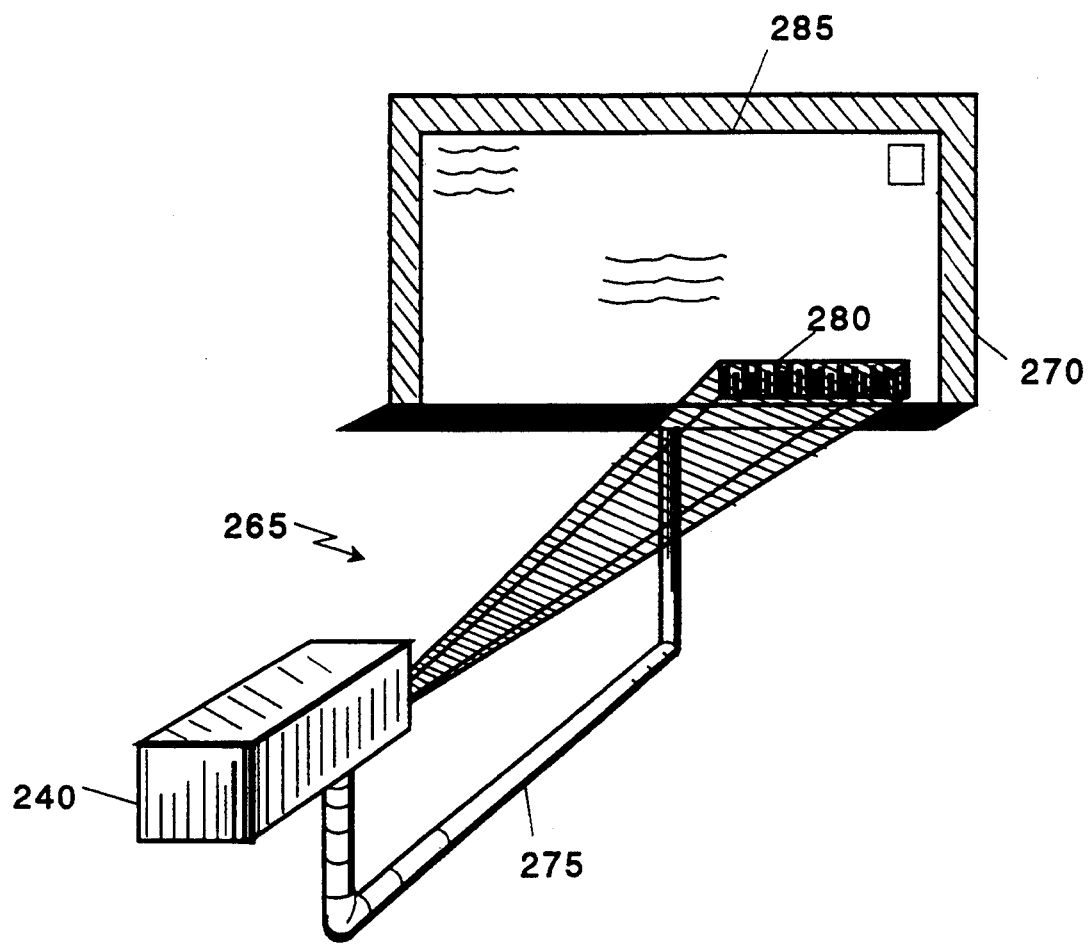
FIG. 4B is a perspective view of a fixed-mount scanner which generates a wide scanning beam as shown in FIGS. 2A and 2B.

FIG. 4B illustrates a second embodiment of a scanning device using the above method. A bar code scanning fixture 265 includes a scanner 240 mounted to a carrier 270 by a support 275. The bar code 280 on a piece of letter mail 285 in the carrier 270 is illuminated by the laser beam emitted from scanner 240.

It will be appreciated that a fixed-mount embodiment similar to that shown in FIG. 4B can be achieved by placing a hand-held scanner such as that illustrated in FIG. 4A in a suitable stand.

In either the hand-held or fixed embodiments, the light emitted from scanner 240 can be selected at least partially within the visible spectrum, so that (because the laser sweeps faster than the eye can discern) the light from the scanner appears as an illuminated rectangle on the target bar code 280 (as illustrated in FIG. 4B). Thus, to scan a bar code, the user orients the bar code and/or scanner so that this rectangle fits over the bar code (i.e., so that the bar code is completely enclosed in the rectangle). With the scanner is oriented in this way, each sweep of the scanner covers the entire bar code. Light reflected from the bar code is collected by scanner 240, and scanner 240 generates a corresponding analog electrical signal having a waveform similar to that shown in FIG. 3.

In one embodiment, scanner 240 includes analog/digital circuitry which converts this analog signal into a sequence of digital samples representing the analog signal, and transmits these samples (e.g., via a cable 255, FIG. 4A) to a controller (e.g., 260, FIG. 4A) which processes the samples (as described below with reference to FIG. 12 et seq.) and generates a digital representation of the digits encoded in the bar code. In a second embodiment, scanner 240 includes circuitry which converts (as described below with reference to FIGS. 8-11) the analog signal directly into a digital representation of the digits encoded in the bar code.

Figure 5:
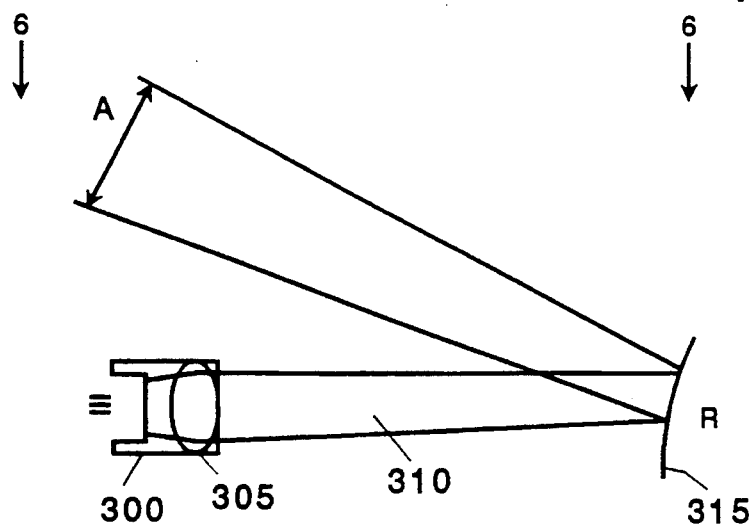
FIG. 5 is a side view of an apparatus for generating a wide scanning beam as shown in in FIGS. 2A and 2B.

As shown in FIG. 5, the optics within scanner 240 include a laser diode 300 and a focusing lens 305 which collects light from the laser diode and focuses the light. The light passing through lens 305 is directed toward a single focal point; thus the light passing from lens 305 forms a substantially conical beam 310. The light focused by lens 305 is reflected by a scanning mirror 315, and then through aperture 245 (FIG. 4) and onto the bar code target (thus laser diode 300 directs light initially away from aperture 245).

Scanning mirror 315 has a cylindrical cross section, as shown (exaggerated) in FIG. 5. In one embodiment, the radius of curvature of scanning mirror 315 is 8.33 inches (dimension R). Because scanning mirror 315 is cylindrical, it disperses the focused laser light in the vertical direction, and as a result the laser light does not focus in the vertical direction. Rather, the radius of curvature of scanning mirror 315 such that, as shown, the light beam is slightly divergent in the vertical dimension after reflecting from scanning mirror 315. This generates a spot 200 which is approximately one-quarter inch high (dimension A) in the target area. The user can adjust the height of the spot by placing the scanner 240 closer to or further from the target bar code.

Figure 6:
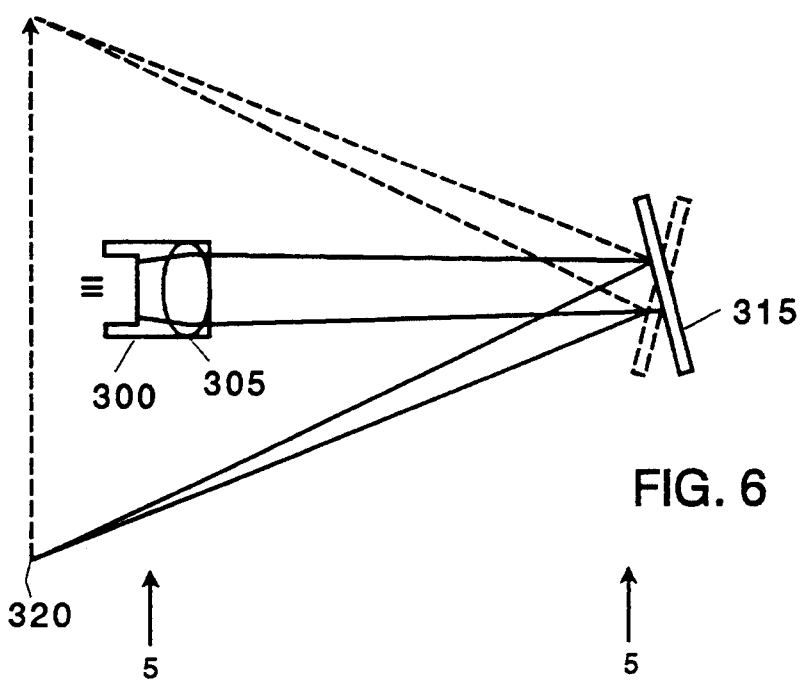
FIG. 6 is a top view of the apparatus of FIG. 5.

As shown in FIG. 6, because scanning mirror 315 has a cylindrical cross section, light is dispersed only in the vertical dimension. Thus in the horizontal dimension the laser light focuses to a narrow waist 320. In other words, the illuminating light source provides a substantially elliptical or oblong illuminated spot exhibiting a nonradially symmetric cross-section which is generally convergent along a first cross-sectional plane and is generally divergent along a second cross-sectional plane. FIG. 6 also illustrates the manner in which scanning mirror 315 swivels to sweep the focused light across the target bar code. When mirror 315 is in the position illustrated by dotted lines, the focused beam is in the position illustrated by dotted lines. An actuator, for example a small galvanometer, is used to rotate the mirror at a steady pace so as to sweep the beam across the target.

Figure 7:
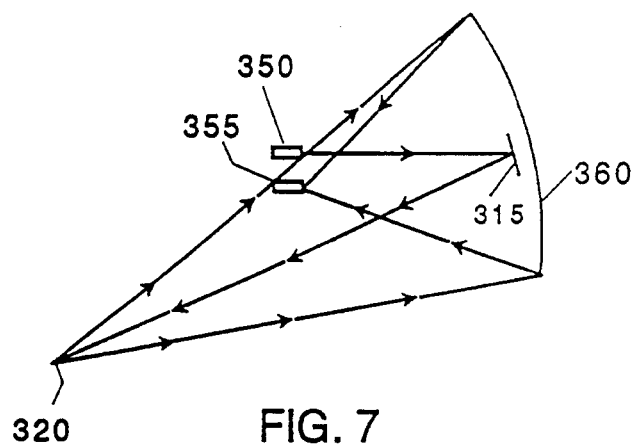
FIG. 7 is a top view of an apparatus for generating a wide scanning beam and collecting and focusing the light reflected from a target into a detector.

As shown in FIG. 7, light is collected from the area 320 by a large collection mirror 360 which sits behind scanning mirror 315 and rotates with scanning mirror 315. As shown, light which departs from the laser/lens module (designated by 350) and reflects off of scanning mirror 315 is incident at the target at a point 320 where it reflects in a substantially random pattern. A portion of the reflected light is collected by collection mirror 360 which refocuses the light toward a sensor diode 355. Sensor diode 355 is slightly displaced from laser/lens module 350, and thus the focal axis of collection mirror 360 is slightly misaligned with the focal axis of scanning mirror 315, as shown (exaggerated) in FIG. 7.

In one embodiment, a suitable optical system can be manufactured through modification of the scanner shown in U.S. Pat. No. 4,896,026 of Krichever et al., which is assigned to the assignee of this application, by inserting a cylindrical scanning mirror in place of flat scanning mirror 19b of FIG. 3.

Figure 8:
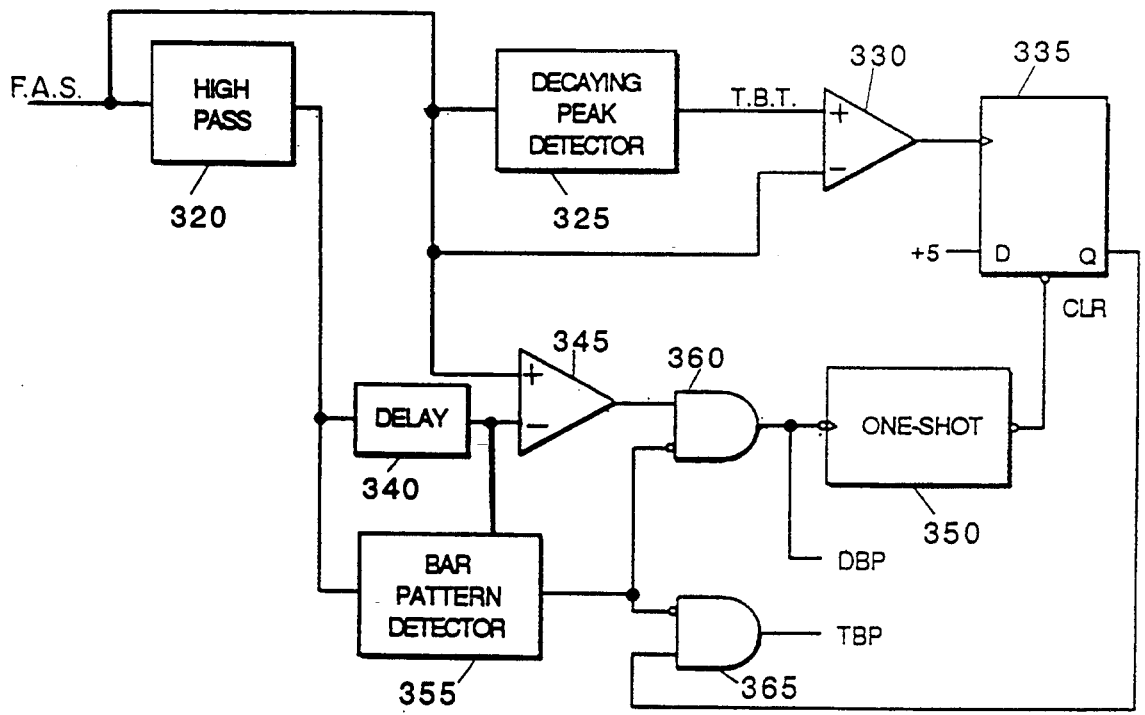
FIG. 8 is a block diagram of an analog and digital circuit for processing the light intensity detected by the apparatus of FIG. 7.
Figure 9:
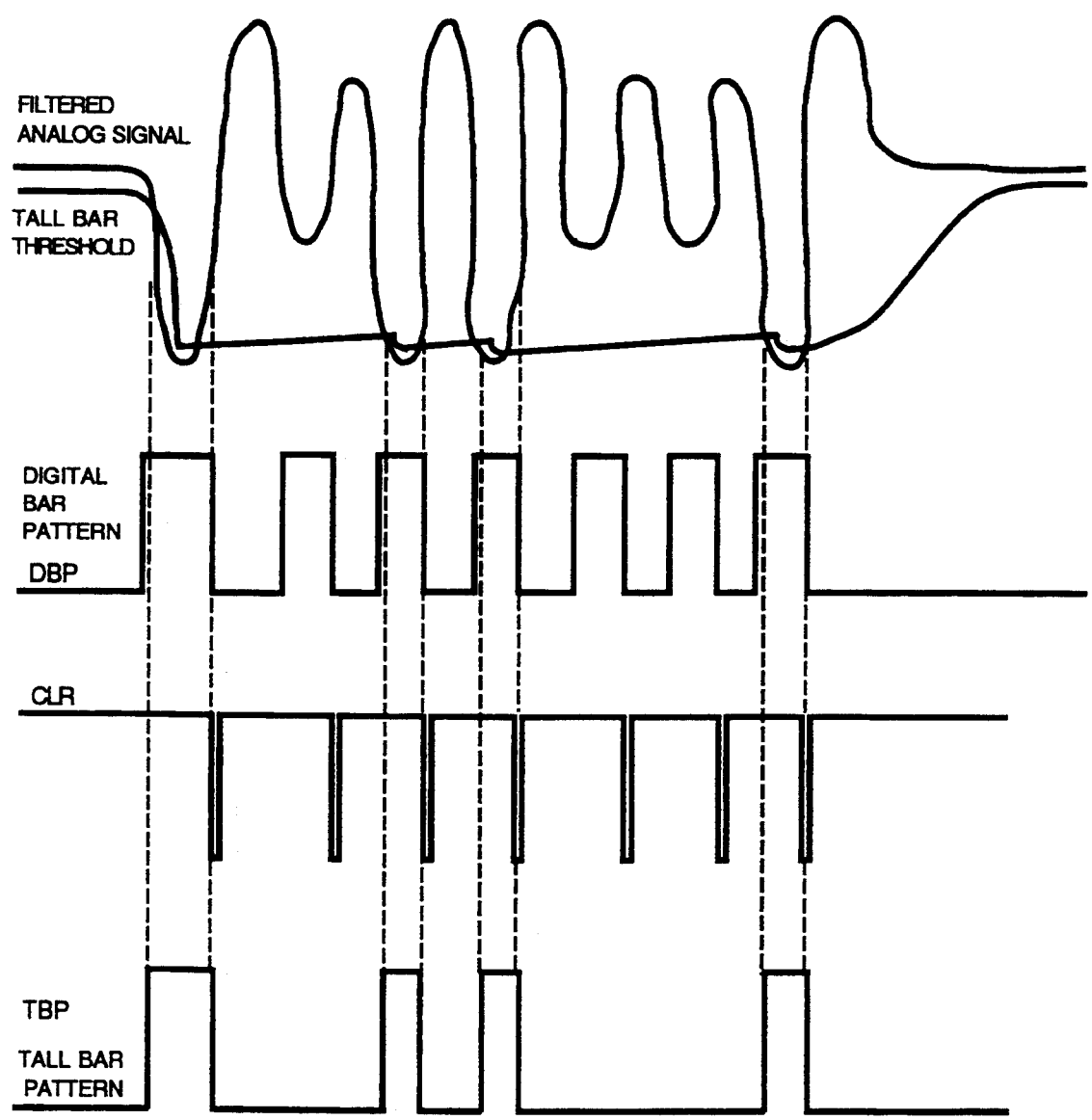
FIG. 9 is a timing diagram of analog and digital signals produced by the circuit of FIG. 8.

As shown in FIG. 8, a circuit for decoding the analog signal illustrated in FIG. 3 generates two digital signals DBP (digital bar pattern) and TBP (tall bar pattern). FIG. 9 demonstrates the relative timing of the DBP and TBP signals; every transition in the filtered analog signal is reflected in a pulse in the DBP signal, whereas only the large negative transitions in the filtered analog signal (which correspond to wide or tall bars) are reflected in a pulse in the TBP signal. These signals can be compared by suitable digital signal processing in controller 260 to detect the pattern of tall and short (or wide and thin) bars in the bar code and thus detect the encoded information. FIG. 9 also illustrates internal analog ("filtered analog signal" and "tall bar threshold") and digital signals ("CLR") generated by the decoding circuit of FIG. 8.

Referring to FIG. 9, the filtered analog signal is generated by a high-pass filter (not shown) which removes the low-frequency components of the raw analog signal (illustrated in FIG. 3) produced by detector 355 (FIG. 7). The result is an analog signal having high frequency positive and negative transitions which correspond to the spaces and bars in the bar code.

To generate the DBP signal, the filtered analog signal is passed through high pass filter 320 and is compared to a delayed version of itself in a manner known in the art as described, for example, in U.S. Pat. No. 4,251,798. Generally, such a circuit includes a delay element 340 introduces a small delay, e.g., approximately 10° of phase shift at the fundamental frequency of the filtered analog signal. Comparator 345 compares this delayed version of the filtered analog signal (at the inverting input of comparator 345) to an undelayed version of the filtered analog signal (at the noninverting input of comparator 345). When the undelayed version has a higher voltage, the output of comparator 345 has a logical "1" value. Otherwise, the output of comparator 345 has a logical "0" value. As a result, when the filtered analog signal is increasing in value, the delayed analog signal has a lower value than the analog signal, and the output of comparator 345 is a "1". Conversely, when the filtered analog signal is decreasing in value, the delayed analog signal has a higher value than the analog signal, and the output of comparator 345 is a "0". Thus the output of comparator 345 is a digital signal having a pattern of pulses which exactly corresponds to the positive and negative transitions of the analog signal, and thus can be used to generate the DBP output signal illustrated in FIG. 9.

To generate the TBP signal, the filtered analog signal is compared to its most negative prior value; if the prior value is exceeded, a tall bar is detected. To store a prior value, the filtered analog signal is passed through a decaying peak detector 325 which captures the largest negative value of the filtered analog signal and produces this value on line 327 for use as a tall bar threshold signal (illustrated in FIG. 9). Comparator 330 compares this tall bar threshold signal (at the noninverting input) to the filtered analog signal (at the inverting input); when the filtered analog signal is more negative than the tall bar threshold signal, the output of comparator 330 is a logical "1" indicating detection of a tall bar. Otherwise, the output of comparator 330 is a logical "0", indicating that no tall bar is being detected. Thus, each tall bar generates a pulse at the output of comparator 330. This output is applied to the clock input of a flip-flop 335. The "D" input of the flip flop is tied to a logical "1" value, and thus the rising edge of the pulse at the output of comparator 330 causes the "Q" output of flip-flop 335 to assume a "1" value. The "Q" output will then retain this "1" value until it is cleared by a low signal on its CLR input.

After the end of each pulse, the "Q" output of flip-flop 335 is cleared to a "0" value, which it will retain until the next tall bar causes a pulse at the output of comparator 330 and consequently sets the "Q" output of flip-flop 335 to a "1". The clear signal (illustrated in FIG. 9) is generated by a one-shot 350, which creates a short negative pulse in response to a falling edge on the DBP signal.

As a result, the output of flip flop 335 can be used to generate the TBP signal; the output transitions to a "1" value during each tall bar and returns to a "0" value after the bar has been scanned. However, short bars will not cause a transition to a "1" value.

The outputs of comparator 345 and flip-flop 335 are gated by gates 360 and 365 to generate the DBP and TBP signals, respectively. Gates 360 and 365 are AND gates having an inverted input connected to the output of bar pattern detector 355. Bar pattern detector 355 reads the filtered analog signal and detects the presence of a bar pattern in the analog signal (as described below). When bar pattern detector 355 is not detecting a bar pattern, the output of bar pattern detector 355 is a logical "1", and thus both the DBP and TBP signals are "0". However, while bar pattern detector is detecting a bar pattern, the output of bar pattern detector 355 is a logical "0" and thus the DBP and TBP signals are equal to the outputs of comparator 345 and flip-flop 335. In this way, extraneous noise outside of a bar pattern will not be reflected on the DBP and TBP signals and will not be received by controller 260.

Note that, as discussed above, POSTNET bar codes can be misdecoded if read backwards (i.e., right to left). Thus, to decode POSTNET bar codes, it is important to disable gates 360 and 365 when the laser beam is sweeping from right to left. Alternatively, wired logic or software in controller 260 can be designed to ignore the TBP and DBP signals while the beam is sweeping from right to left.

Figure 10:
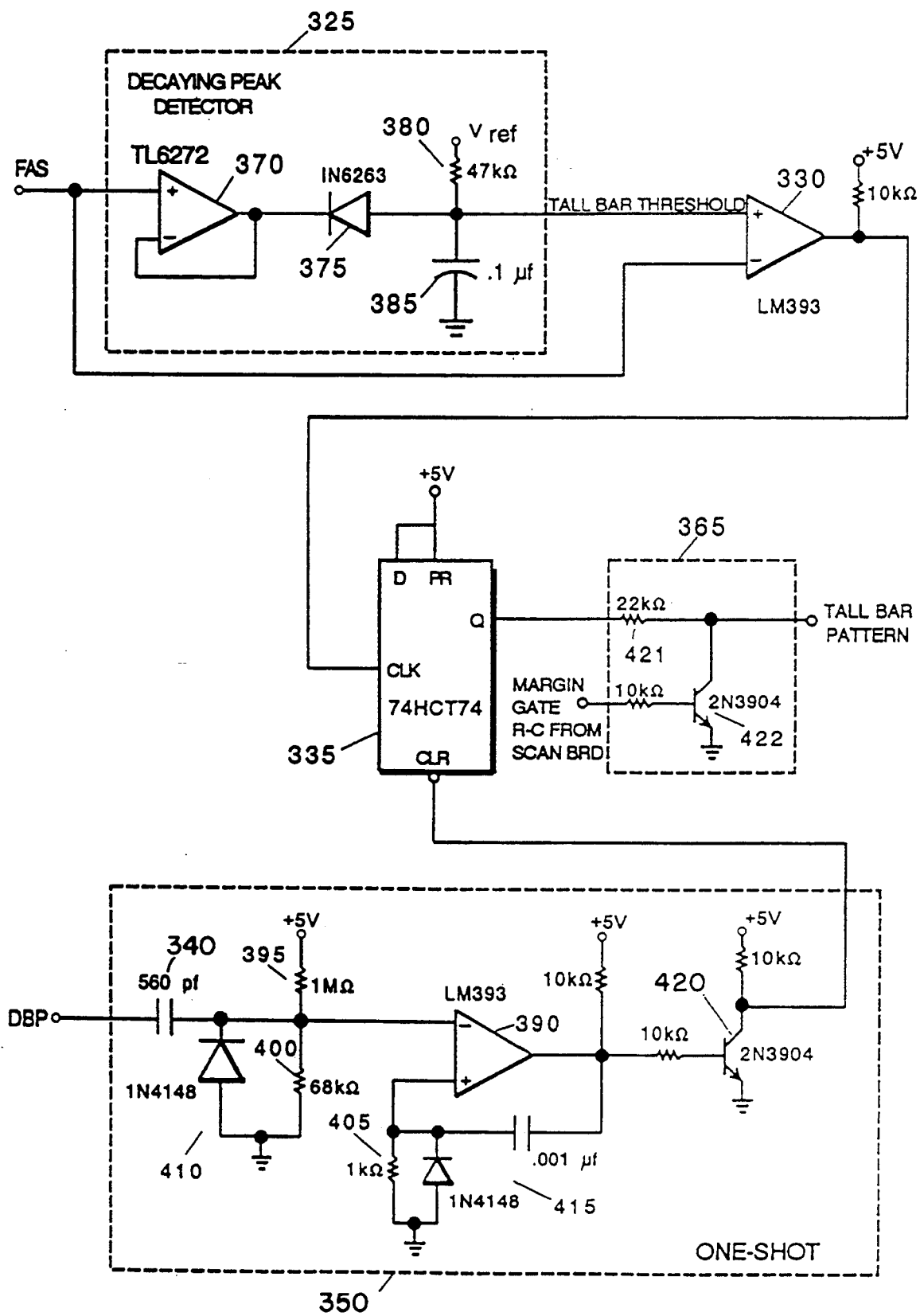
FIG. 10 is a circuit diagram of one implementation of the peak detector, one-shot, and flip-flop, and gate of FIG. 8.

As illustrated in FIG. 10, in one specific embodiment, decaying peak detector 325 can be implemented by an op-amp 370 configured as a voltage follower, with the output of the op-amp 370 connected via diode 375 to a resistor 380 and capacitor 385. If the voltage of the filtered analog signal decreases below −0.6 Volts, diode 375 will turn "on" and the voltage of capacitor 385 will follow the filtered analog signal as long as the analog signal continues to decrease. However, once the filtered analog signal begins to increase, diode 375 will turn "off" and capacitor 385 will store the lowest analog voltage attained. Thereafter, over time capacitor 385 will discharge toward 0 volts via resistor 380 (with a time constant of 4.7 milliseconds).

As further illustrated in FIG. 10, in one specific embodiment, one-shot 350 can also be implemented by a comparator/diode/transistor circuit. In the DC steady state, the output of comparator 350 has a logical "0" value because its inverting input is held slightly above ground by a voltage divider comprised of resistors 395 and 400, and its non-inverting input is held at ground by resistor 405. However, high frequency transition in the DBP signal having frequency components at or above 28 kilohertz will pass through capacitor 340 and momentarily change the voltage of the inverting input of comparator 390. If the transition has a positive slope, the voltage of the inverting input of comparator 390 will be increased and the output of comparator 390 will remain at "0". However, if the transition has a negative slope, the voltage of the inverting input of comparator 390 will be decreased below ground (but not below the turn-on voltage of limiting diode 410). As a result, the output of comparator 390 will transition to a "1" value. This positive transition at the output of comparator 390 will subsequently pass through capacitor 415, causing the voltage of the noninverting input of comparator 390 to increase well above ground, thereby increasing the voltage difference between the inverting and noninverting inputs of comparator 390 and locking comparator 390 into a "1" output. Subsequently, however, capacitors 340 and 415 will charge and the voltages on the non-inverting and inverting inputs of comparator 390 will return to their DC steady state values. Thus, at some point the voltage of the inverting input of comparator 390 will again become greater than that of the noninverting input, at which time the output of comparator 390 will return to a "0" value.

Thus, the output of comparator 390 generates a short positive pulse in response to a negative transition in the DBP signal. This output is applied to the base of NPN transistor 420; thus transistor 420 is turned "on" during a short period following each negative transition in the DBP signal, pulling the CLR signal of flip-flop 335 low and thereby clearing the output of the flip-flop 335.

One specific implementation of gate 365 is also illustrated in FIG. 10. The output of flip-flop 335 passes through a resistor 421 to produce the tall bar pattern output. Pull down transistor 422 connects the tall bar pattern output to ground, and the output of bar pattern detector 355 (which is referred to as the "margin gate R-C" signal) is connected to the base of pull down transistor 422, such that when the margin gate R-C signal is greater than approximately 0.6 Volts from ground, the tall bar pattern output is pulled to ground by transistor 422.

Figure 11:
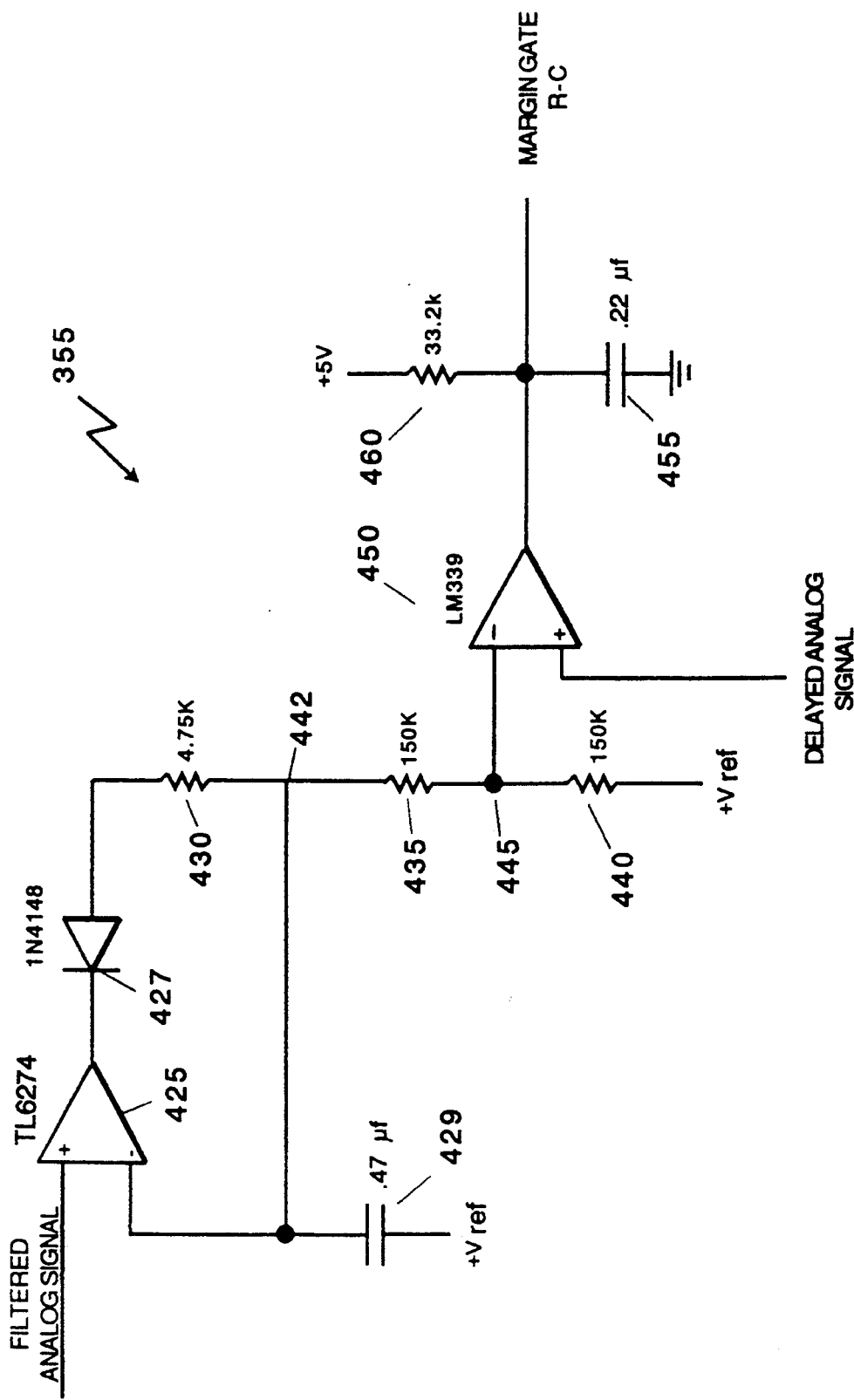
FIG. 11 is a circuit diagram of one implementation of the bar pattern detector of FIG. 8.

As illustrated in FIG. 11, in one specific embodiment the margin gate R-C signal is generated by comparator 450, which has an open collector output, connected to a capacitor 455 and resistor 460. The inverting input of comparator 450 is connected to node 445, which (as explained below) has a voltage just slightly below the average voltage of the filtered analog signal. The non-inverting input of comparator 450 is connected to a delayed version of the analog signal, e.g., the signal generated by delay element 340 (FIG. 8). As a result, between bar codes, the filtered analog signal has a higher voltage than the voltage of node 445, and thus the open-collector output of comparator 339 is turned off and, as a result, capacitor 455 charges to the 5 volt supply voltage through resistor 460. Thus, during these periods gating transistors such as transistor 422 (FIG. 10) are turned "on" grounding the bar pattern output lines. However, while a bar code is being scanned, the delayed analog signal includes negative voltage pulses (as shown in FIG. 9); during each of these pulses the delayed analog signal is momentarily lower in voltage than node 445, and as a result the open-collector output of comparator 339 is enabled, discharging capacitor 455. As a result, gating transistors such as transistor 422 (FIG. 10) are turned "off". Each negative pulse in the analog signal (caused by a bar in the bar code) will cause comparator 450 to discharge capacitor 455, and thus as a result capacitor 455 will remain discharged until all bars have been detected. Only after the last bar has been detected will comparator 450 cease discharging capacitor 455 and allow the margin gate R-C signal to increase sufficiently to turn gating transistors such as transistor 422 (FIG. 10). "on".

The voltage of node 445, which as mentioned above is slightly lower than the average voltage of the analog signal, is generated by an energy averaging circuit comprising op-amp 425, feedback diode 427 and resistor 430, capacitor 429 and resistors 435, 440. When the voltage of the filtered analog signal is less than the voltage of node 442 (e.g., during a negative peak of the filtered analog signal which indicates a bar code), the non-inverting input of op-amp 425 has a lower voltage than the inverting input of op-amp 442, thus causing the output voltage of op-amp 425 to decrease toward its negative power supply voltage. This causes current to flow through diode 427 and resistor 430 and thereby charges (i.e., stores energy in) capacitor 429, decreasing the voltage of node 442. However, when the voltage of the filtered analog signal is greater than the voltage of node 442 (e.g., between bars in a bar code, and between bar codes), the output voltage of op-amp 425 increases toward its positive power supply voltage. In this situation, diode 427 cuts off, and no current flows through resistor 430. During these periods, capacitor 429 slowly discharges (i.e., releases energy) through resistors 435 and 440 so that the voltage of node 442 increases toward the reference voltage $V^{ref}$ (which is approximately equal to or slightly greater than the average analog signal voltage). Through the above exchanges of energy, capacitor 429 will acquire a voltage at which the energy stored while the filtered analog signal voltage is less than that of node 442 equals the energy released while the filtered analog signal voltage is greater than that of node 442. This voltage will be very near to the average value of the analog input signal, and, if temperature or age cause the average value of the analog input signal to vary, the voltage of node 442 will track these variations.

Figure 12A:
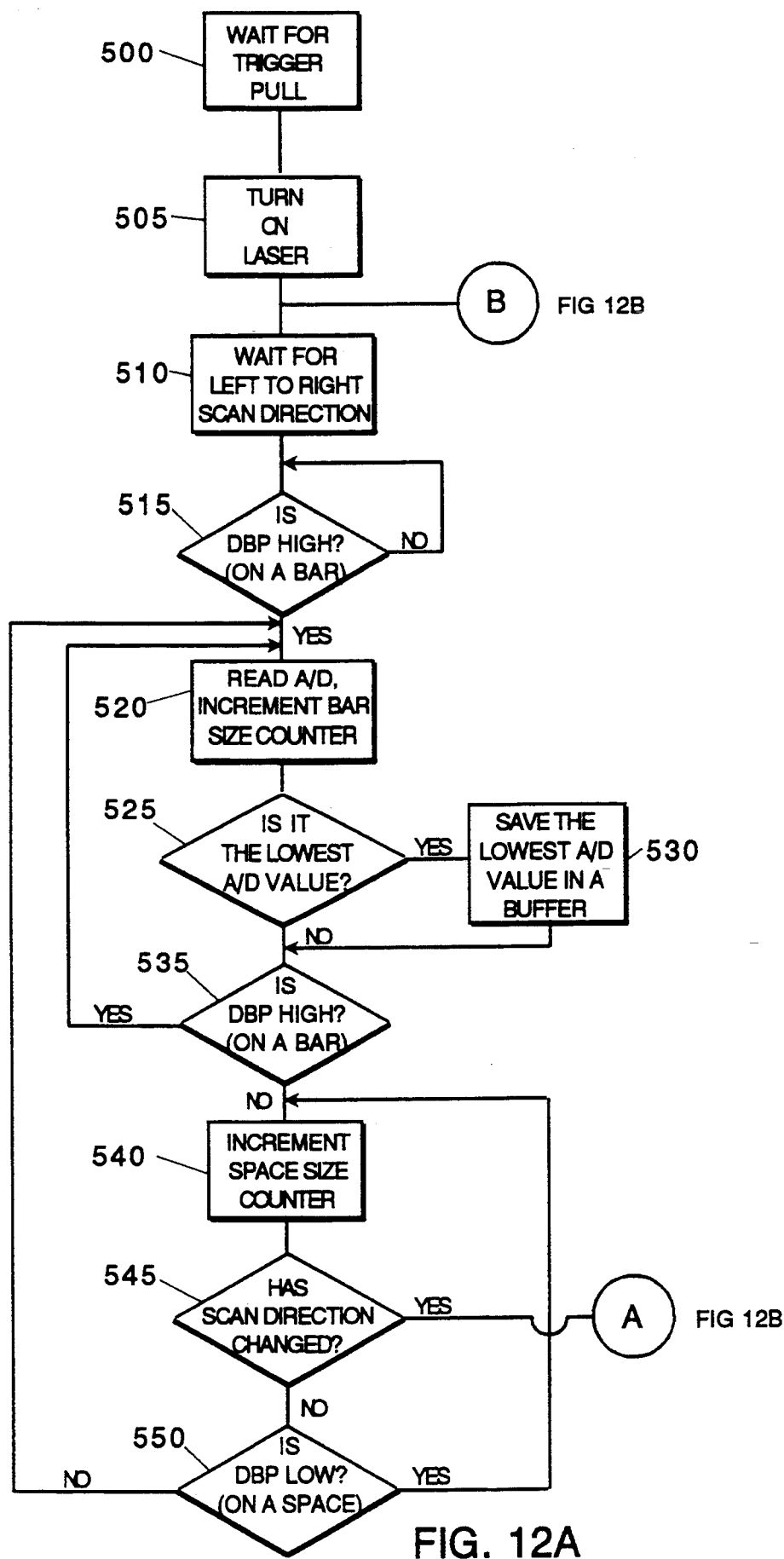
FIGS. 12A–12C are flow charts describing the procedure to be followed by a microprocessor to process the light intensity detected by the apparatus of FIG. 7.
Figure 12B:
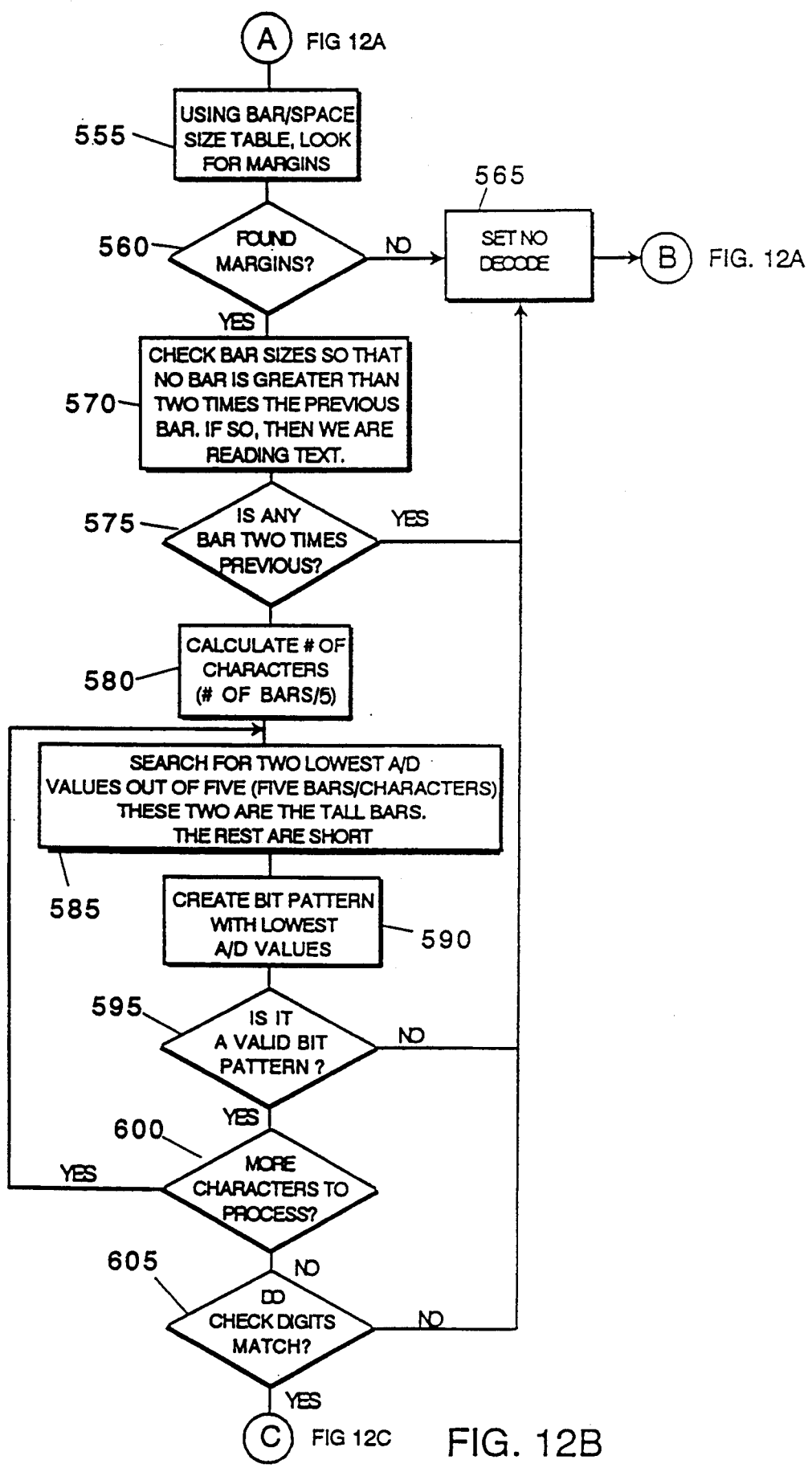
Figure 12C:
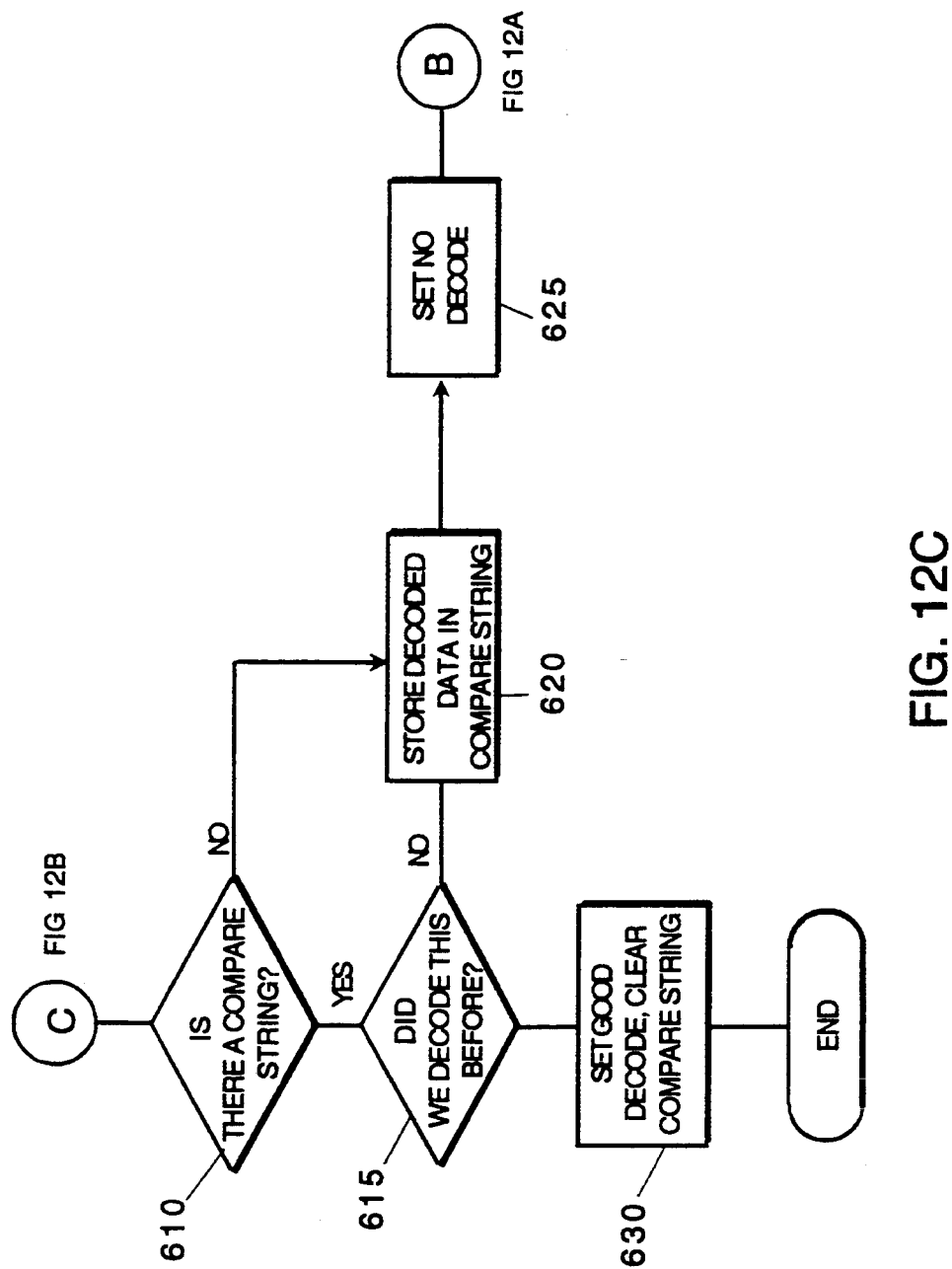

As illustrated in FIGS. 12A–12C, in a second embodiment, the filtered analog signal shown in FIG. 9 is decoded by software. In this embodiment, the filtered analog signal shown in FIG. 9 is digitized by an analog to digital converter, and the resulting digital signals are transferred to a microprocessor. The bar pattern detection circuit 355 (FIGS. 8, 11), delay element 340 (FIG. 8) and comparator 345 (FIG. 8) are also used in this embodiment to generate the digital bar pattern (DBP) signal and supply this signal to the microprocessor.

Referring to FIG. 12A, the microprocessor first waits 500 for the user to pull the trigger 250 on the scanner 240 (FIG. 4). When the user pulls the trigger, the microprocessor turns on 505 the scanning laser 300. The microprocessor then waits 510 for the beginning of a left-to-right sweep of the laser beam (because, as discussed above, bar codes such as POSTNET may be misdecoded when read backwards).

During the left-to-right sweep, the microprocessor first waits until the laser beam is on a bar by repeatedly checking 515 if the DBP signal is high. When the DBP signal goes high, the microprocessor reads 520 the A/D converter output and initializes a bar size counter. The microprocessor then determines 525 whether the converter output is the lowest value that has been read, and if so, stores 530 the value in a buffer. The microprocessor then determines whether the laser beam is still on the bar by checking if the DBP signal is high. If so, the microprocessor returns to step 520 and increments the bar size counter.

When the DBP signal goes low, indicating the end of the bar, the microprocessor proceeds from step 535 to step 540, where it initializes a space size counter. The microprocessor then checks 545 if the scan direction has changed, indicating the end of the sweep of bars. If the scan direction has not changed, the microprocessor determines whether the laser beam has reached another bar by checking 550 if the DBP signal is low. If so, the laser beam is still on the space and the microprocessor returns to step 540 and increments the space size counter.

If the DBP signal goes high before the sweep direction changes, the laser beam has reached another bar, in which case the microprocessor returns to step 520 where it reads the A/D converter, sets up a bar size counter, and proceeds to step 525.

Once the laser beam has completed a sweep and reverses direction, the microprocessor proceeds from step 545 of FIG. 12A to step 555 of FIG. 12B, and attempts to decode the bar code. The decoding process uses the values of the bar and space size counters stored during the steps 520 and 540 of FIG. 12A and the A/D output values buffered during step 530 of FIG. 12A.

Referring to FIG. 12B, to decode the bar code, the microprocessor performs a number of checks on the data collected by the process of FIG. 12A. First, the microprocessor evaluates 555 the stored bar and space counters to look for a pattern of bars and spaces having a relatively consistent width, attempting to find the margins of the bar code by locating the beginning and end of this pattern. If 560 the margins are not found, the microprocessor indicates 565 that the bar code was not decoded properly, and returns to step 510, FIG. 12A, to wait for the next sweep.

If the margins are found, the microprocessor then compares 570 the value of each bar and space counter to those immediately proceeding. As shown in FIG. 9A, the width of the bar and space pulses on the filtered analog signal may vary somewhat during a scan; however, the width should not vary by more than a factor of two from one bar to the next. Thus, if 575 excessive variance appears between bars in the filtered analog signal, then the microprocessor proceeds to step 565 and indicates that the bar code was not decoded properly.

If the bar code signals pass the tests of steps 560 and 575, then the microprocessor proceeds to decode the information from the bar code signals. The decoding procedure for a POSTNET bar code is shown in FIG. 12B.

In this procedure, the microprocessor first computes the number of characters in the bar code by dividing 580 the number of bars that were detected by 5. Then, the microprocessor collects groups of five bars (i.e., five values representing the lowest A/D values during a bar). Then the microprocessor searches 585 for the two lowest A/D values in the group of five values. These two values are assumed to correspond to the tall bars and the remaining values are assumed to correspond to the short bars. The microprocessor therefore forms 590 a bit pattern corresponding to the tall and short bars and then checks 595 the bit pattern to see if it is valid. If the pattern is not valid, the microprocessor proceeds to step 565 and indicates that the bar code was not decoded properly. Otherwise, if, 600, there are more characters to be processed, the microprocessor returns to step 585 and attempts to process the next character.

After each of the characters has been decoded and validated, the microprocessor then compares 605 the check digits in the bar code to the other digits in the bar code, and if they do not match, the microprocessor proceeds to step 565 and indicates that the bar code was not decoded properly. However, if the check digits match, the bar code is assumed to be correctly decoded and the microprocessor proceeds to step 610, FIG. 12C.

Referring to FIG. 12C, for security reasons, the decoding process requires that the bar code be decoded to the same value twice before that value is accepted as a correct decode. Thus, after the bar code has been decoded the first time, the microprocessor stores 620 the decoded value in a compare string, indicates 625 no decode and returns to step 510, FIG. 12A. After the second successful decode, the microprocessor determines 610 that there is a compare string, and then compares 615 the compare string to the recently-decoded twice. If the two values do not match, the most recently decoded value is stored 620 in the compare string and the microprocessor proceeds to step 625 to indicate that there has not been a successful decode. However, if the compare string matches the recently decoded value, then the microprocessor signals 630 a good decode to the user and finishes processing.

Figure 13:
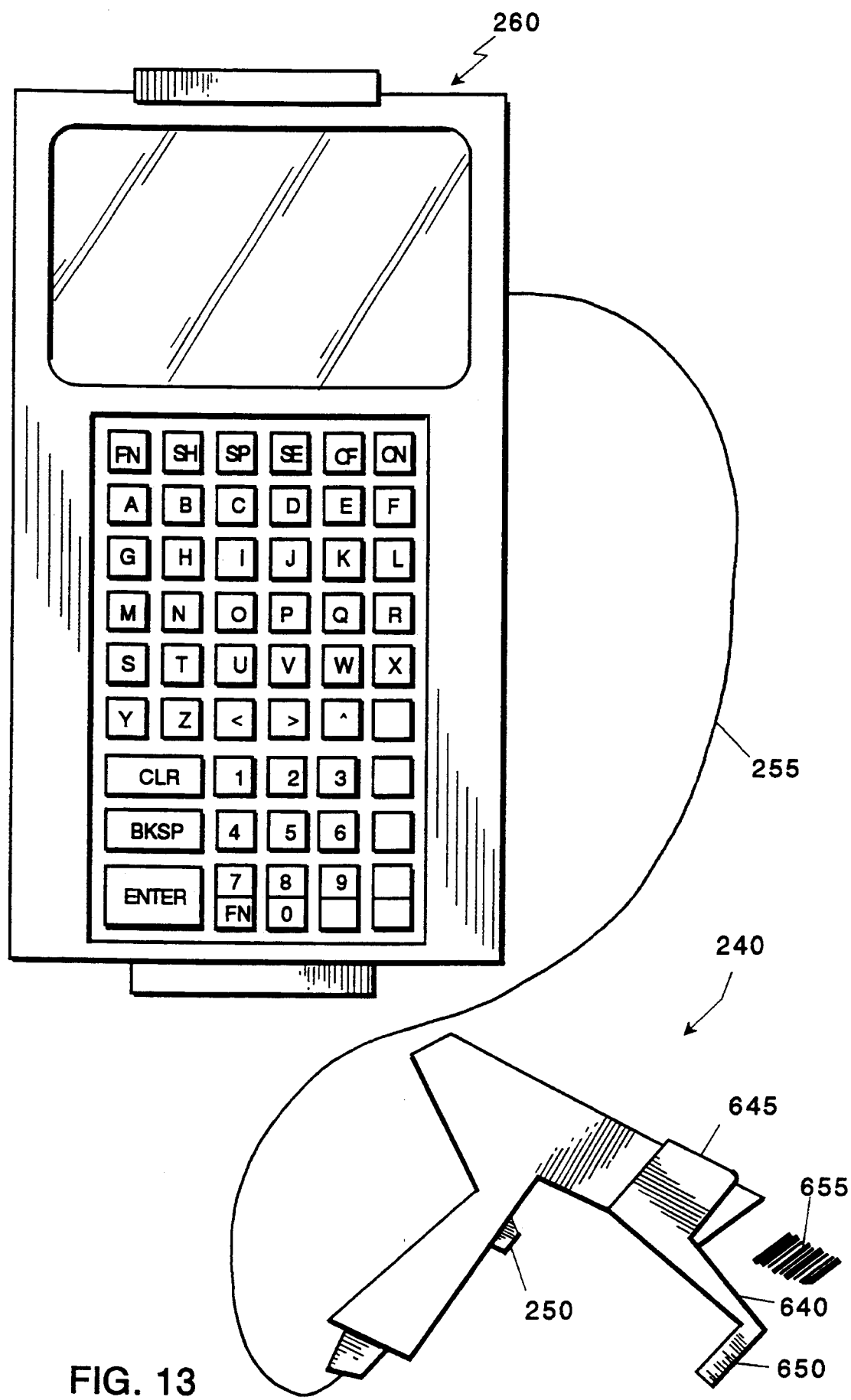
FIG. 13 is a perspective view of the hand-held scanner of FIG. 4A positioned in a trainer stand to allow use as a verifier.

Other embodiments are within the scope of the following claims. For example:

The above circuitry and software could be used to verify the acceptability of a candidate bar code. (Further details on this technique can be found in above-referenced previously filed copending U.S. patent application Ser. No. 07/592,021.) Referring to FIG. 13, in this embodiment, scanner 240 is mounted in receptacle slot 645 of trainer stand 640; the base 650 of trainer is placed on a flat surface bearing a calibration bar code 655, so that the trainer stand 640 positions scanner 240 a predetermined distance and angle from the calibration bar code 655. A/D converter samples generated during a sweep of the calibration bar code 655 are stored by controller 260 and used to generate calibrated values for the relative contrast of tall or wide bars, short or narrow bars, and spaces, as well as the widths of bars and spaces. (The calibrated values may be different for different portions of the sweep, to compensate for optical and mechanical variations.) Thereafter, the calibration bar code is replaced by the candidate bar code, and scanner 240 sweeps the candidate bar code. During the sweep, controller 260 compares the contrast of the bars and spaces of the candidate bar code to those stored for the calibration bar code, and also compares the widths of the bars and spaces of the candidate bar code to those stored for the calibration bar code. If the contrast and widths of the candidate bar code are within suitable tolerances, controller 260 signals that the candidate is acceptable, otherwise not.

Figure 14A:
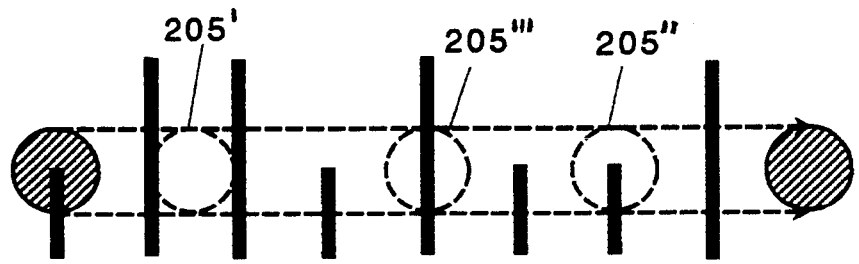
FIGS. 14A–14C are plan views of a substantially circular scanning beam reading height-modulated and width-modulated bar codes.
Figure 14B:
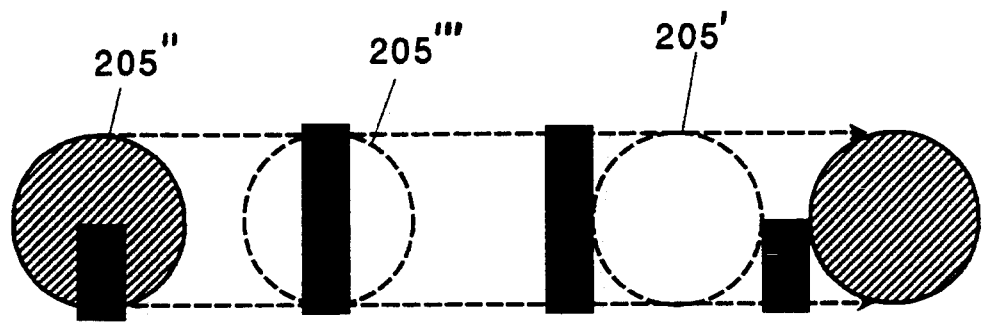
Figure 14C:
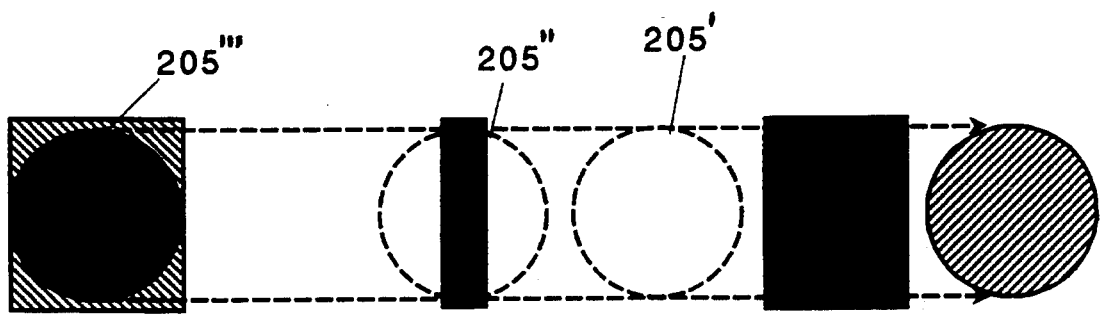

It is not necessary that the laser beam spot be oblong, or that the laser beam spot encompass an entire bar of the bar code during the scan; the spot should preferably be oriented relative to the bar code so that a substantially larger fraction of the spot is occupied by the wide or tall bars than by the narrow or short bars. Any shape of spot may be used, as long as the spot is small enough that succeeding bars are not obscured by each other, but still large enough to allow the user to accurately orient the sweeps of the laser beam with the bar code. Thus, for example, as shown in FIGS. 14A and 14B, a height modulated bar code in which the bars are sufficiently widely spaced can be read by a substantially circular spot. FIG. 14A also illustrates that the spot may be substantially smaller than the height of the bars, as long as the user is able to accurately orient the sweep of the spot so that it encompasses a smaller portion of the short bars than of the large bars. FIG. 14C illustrates that a width-modulated bar code, if sufficiently widely spaced, can also be read by a substantially circular spot. Each of these configurations will produce an intensity variation similar to that shown in FIG. 3 and thus can be decoded in the manner disclosed above.

A wide laser beam spot could also be used to read a stacked or two-dimensional bar code symbology, or any other symbology in which information is dispersed both vertically and horizontally.

Figure 15:
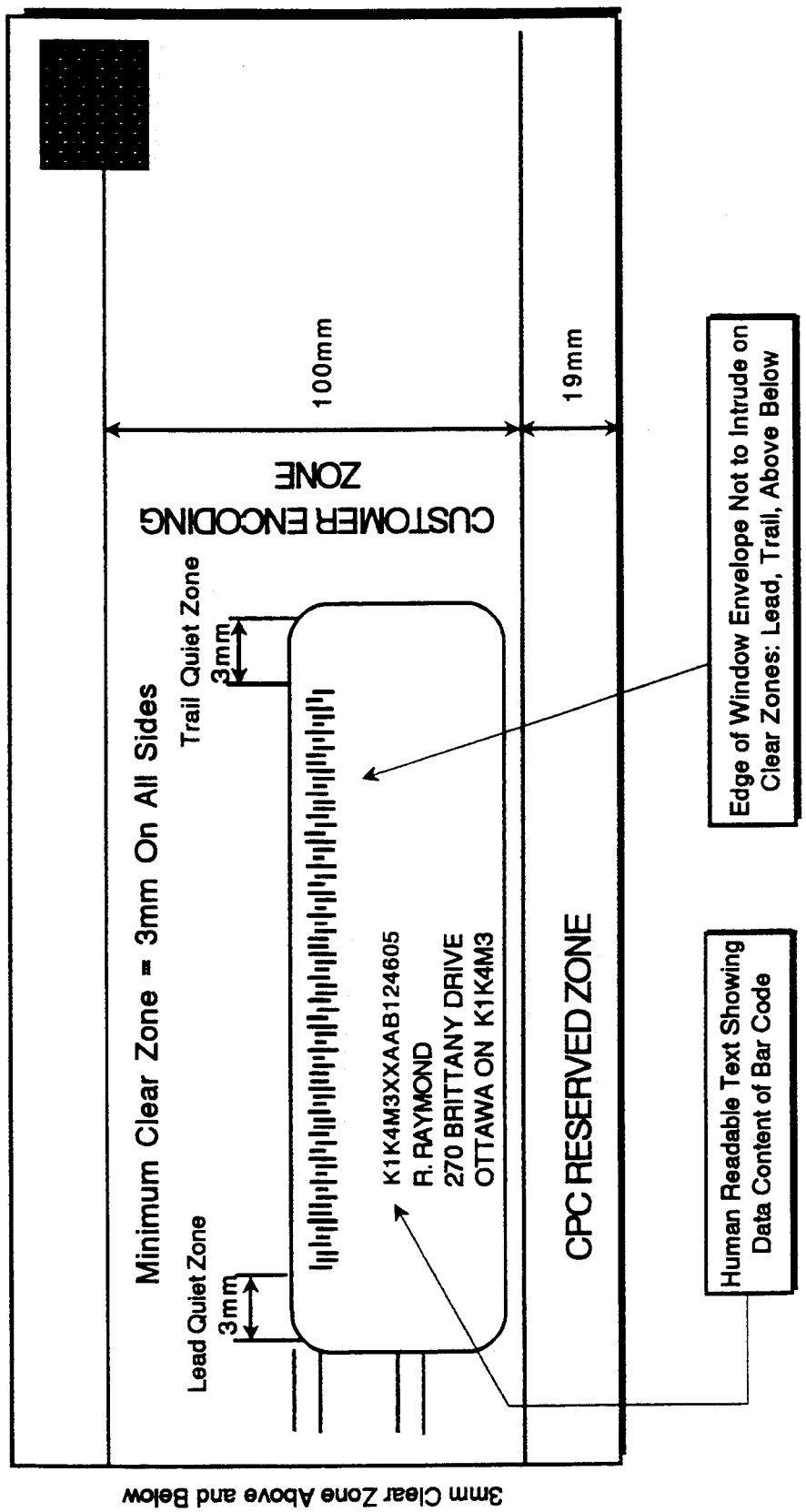
FIG. 15 is a plan view of a height-modulated bar code positioned on a letter in accordance with the Canadian postal symbology.

Other symbologies could be read by the methods and apparatus described above. For example, referring to FIG. 15, the Canadian postal symbology includes tall bars, medium-height bars, and short bars. This symbology could be read and decoded by the above apparatus by modifying the above apparatus to distinguish the medium-height bars from the short bars. For example, two decaying peak detectors having different decay time constants could be used to generate two thresholds for comparison with each negative impulse of the analog signal. In a software embodiment, the minimum sample value for each impulse could be compared to other minimum sample values to determine which impulses represented small, medium, and tall bars. Note that the symbology illustrated in FIG. 15 includes two types of medium-height bars—"down" medium bars extending below the short bars and "up" medium bars extending above the short bars. In some applications the apparatus described above may be unable to distinguish between the "down" and "up" medium bars, in which case the decoding software would need to distinguish the "up" and "down" bars by determining whether an "up" or "down" bar would result in valid characters, and/or by using any other error correction information included in the bar code.

What is claimed is:

1. A method for reading a symbol comprising a plurality of sectors, including large and small sectors, said large sectors having substantially greater area than said small sectors, comprising the steps of:

illuminating a region of said symbol with a light source to form an illuminated region;

scanning said light source across said symbol so that said illuminated region traverses a large sector and a small sector so that the largest portion of said illuminated region which is occupied by said small sector during said scanning is substantially smaller than the largest portion of said illuminated region which is occupied by said large sector during said scanning;

collecting light which is reflected from said symbol as said light source scans across said symbol, said collected light varying in intensity as said light source traverses said sectors;

sensing said collected light to generate an analog signal which exhibits peaks, small valleys, large valleys and transitions therebetween as said light source scans said symbol;

generating a digital bar pattern (DBP) signal which includes a pulse for each detected bar;

generating a tall bar pattern (TBP) signal which includes a pulse for each large valley of the analog signal; and decoding said digital bar pattern signal and said tall bar pattern signal to determine characters encoded into said sectors.

2. The method of claim 1 wherein substantially all of said illuminated region is occupied by said large sector as said illuminated region scans across said large sector.

3. The method of claim 1 wherein substantially all of said small sector is encompassed by said illuminated region as said illuminated region scans across said small sector.

4. The method of claim 1 wherein said sectors comprise spaces and bars, said large sectors comprise tall bars, and said small sectors comprise short bars.

5. The method of claim 4 wherein said symbol is encoded according to the POSTNET methodology.

6. The method of claim 1 wherein said sectors comprise spaces and bars, said large sectors comprise wide bars, and said small sectors comprise narrow bars.

7. The method of claim 1 wherein at most three sectors are encompassed by said illuminated region at the same time during said scanning.

8. The method of claim 1 wherein said illuminated region is substantially oblong, the length of said illuminated region being at least twice the width of said illuminated region.

9. The method of claim 8 wherein said light source is a laser beam having a non-radially symmetric cross-section, and within a working range said laser beam is generally convergent along a first cross-sectional plane and is generally divergent along a second cross-sectional plane.

10. The method of claim 9 further comprising the steps of:

measuring and storing a value representative of a magnitude of a large valley in the variation of the intensity of the collected light thus providing a stored value;

said stored value is measured, stored, and compared to values representative of the magnitude of subsequent valleys by a microprocessor apparatus.

11. The method of claim 8 wherein said symbol include bars and spaces and, during said scanning, the long dimension of said oblong illuminated region is substantially aligned with said bars.

12. The method of claim 1 further comprising the steps of:

measuring and storing a value representative of a magnitude of a large valley in the variation of the intensity of the collected light thus providing a stored value;

comparing said stored value to a magnitude of a subsequent valley in the variation of the intensity of the collected light; and if the magnitude of said subsequent valley substantially equals the magnitude represented by said stored value, determining that said subsequent valley corresponds to a large sector, otherwise determining that said subsequent bar corresponds to a small sector.

13. The method of claim 12 wherein the intensity of the collected light is represented by an analog electrical signal, said stored value is measured and stored by a negative peak detector circuit, and an output of said negative peak detector circuit is compared to said analog electrical signal by an analog comparator.

14. The method of claim 13 wherein said negative peak detector circuit stores the most negative value presented thereto and said output of said peak detector circuit increases slowly over time.

15. The method of claim 1 adapted to verifying the acceptability of a symbol, further comprising:

reading a calibration symbol mounted at a distant position relative said light source to generate calibrated electrical signals indicative of the orientation, size, or contrast of sectors of said calibration symbol, storing said calibrated electrical signals, reading a candidate symbol mounted substantially at said distant position relative to said light source to generate candidate electrical signals indicative of the orientation, size, or contrast of sectors of said candidate symbol, comparing said calibrated electrical signals to said candidate electrical signals, and determining whether the orientation, size, or contrast of sectors of said candidate symbol are suitably similar to the orientation, size, or contrast of sectors of said calibration symbol.

16. Apparatus for measuring a reflectivity characteristic of a target label, wherein a label is defined as including a plurality of symbols each having a pattern of elements including less-reflective bar areas and more reflective space areas, said apparatus comprising:

a light source for scanning light across said target label;

collecting means for collecting light which is reflected from a symbol as said light source scans across said symbol, said collected light varying in intensity as said light source scans said label;

sensing means for sensing said collected light to generate an analog signal which exhibits peaks, small valleys, large valleys and transitions therebetween as said light source scans said label;

digital bar pattern generating means, coupled to said sensing means, for generating a digital bar pattern (DBP) signal which includes a pulse for each detected bar;

tall bar pattern generating means, coupled to said sensing means, for generating a tall bar pattern (TBP) signal which includes a pulse for each large valley of the analog signal;

decoding means for decoding said digital bar pattern signal and said tall bar pattern signal to determine characters encoded into said symbols;

signal comparison means for comparing (1) reflectivity data obtained by directing light to said target label with (2) reflectivity data obtained by directing light to a calibration standard;

wherein said reflectivity data represent reflectivity conditions at a plurality of points on each of said target label and said calibration standard.

* * * * *